No. 647,009. Patented Apr. 10, 1900.
G. MARCONI.
APPARATUS EMPLOYED IN WIRELESS TELEGRAPHY.
(Application filed Dec. 26, 1899.)
(No Model.) 2 Sheets—Sheet 1.

No. 647,009. Patented Apr. 10, 1900.
G. MARCONI.
APPARATUS EMPLOYED IN WIRELESS TELEGRAPHY.
(Application filed Dec. 26, 1899.)

(No Model.) 2 Sheets—Sheet 2.

UNITED STATES PATENT OFFICE.

GUGLIELMO MARCONI, OF LONDON, ENGLAND, ASSIGNOR TO THE WIRELESS TELEGRAPH AND SIGNAL COMPANY, LIMITED, OF SAME PLACE.

APPARATUS EMPLOYED IN WIRELESS TELEGRAPHY.

SPECIFICATION forming part of Letters Patent No. 647,009, dated April 10, 1900.

Original application filed June 13, 1899, Serial No. 720,355. Divided and this application filed December 26, 1899. Serial No. 741,614. (No model.)

*To all whom it may concern:*

Be it known that I, GUGLIELMO MARCONI, electrician, a subject of the King of Italy, residing at 28 Mark Lane, in the city of London, England, have invented certain new and useful Apparatus Employed in Wireless Telegraphy, of which the following is a specification.

This invention relates to improvements in the apparatus described in United States Letters Patent No. 627,650, granted to me June 27, 1899. In that specification I described connecting the aerial conductor to a capacity which may be the earth through the primary of an induction-coil, the ends of the imperfect contact or sensitive tube being connected to the ends of the secondary. In place of winding both the primary and secondary in single layers, as claimed in that specification, the coils are now either made very short (not much exceeding two centimeters in length) or else are wound in sections. The number of turns in the successive layers of the secondary should diminish as the distance from the center increases, but this, although preferable, is not essential. It is also found desirable to connect direct to the sensitive tube or imperfect contact (not through the condenser) the end of the secondary which is farthest away from the nucleus or axial line of the coil.

Figure 1:
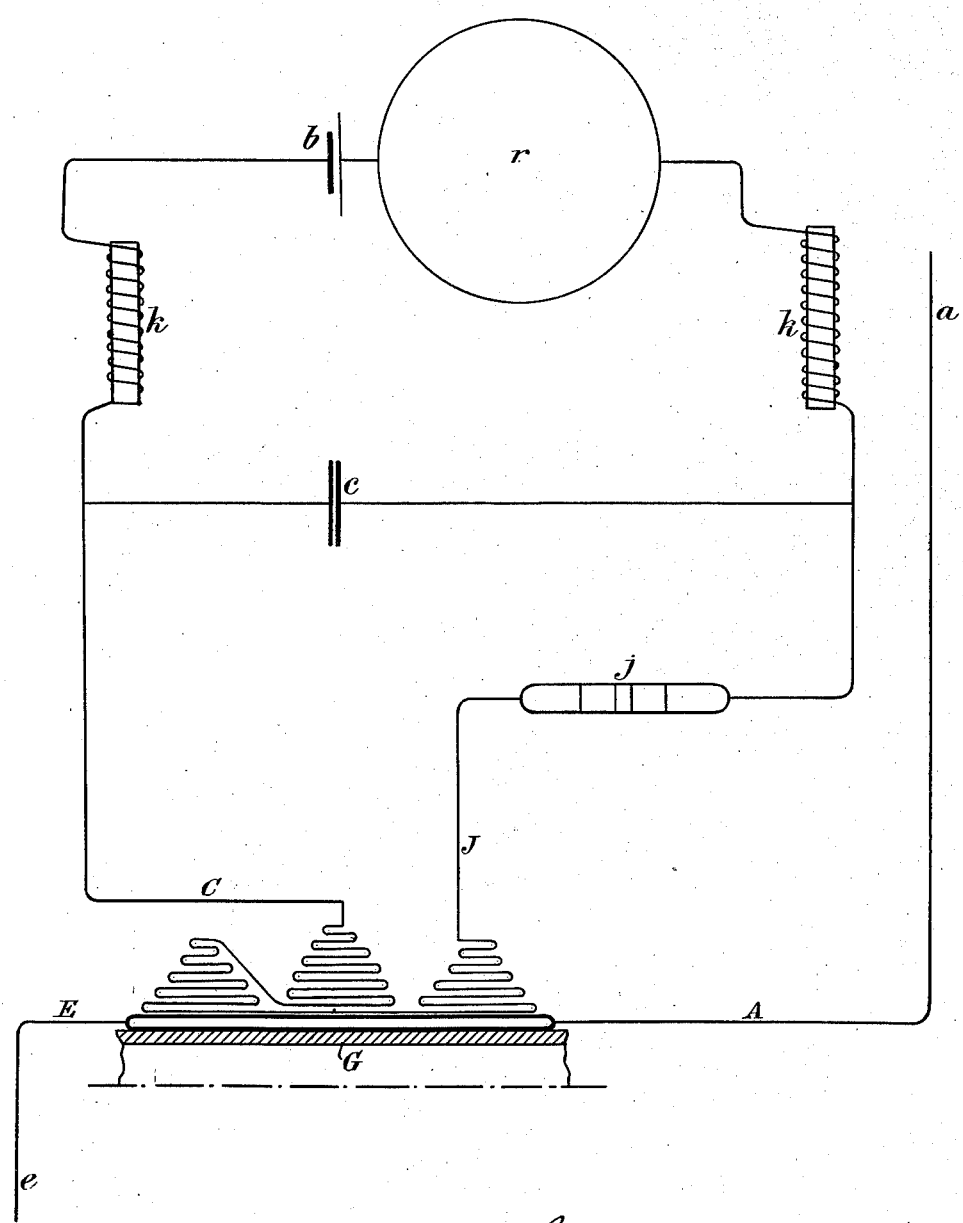
Figure 2:
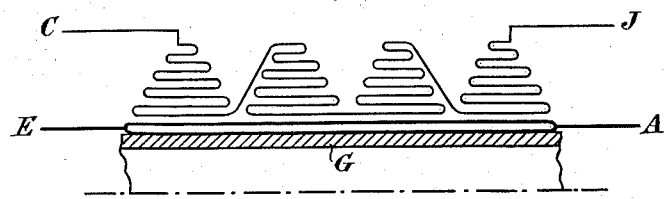
Figure 3:
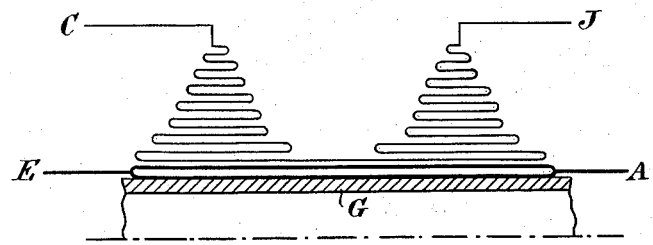
Figure 4:
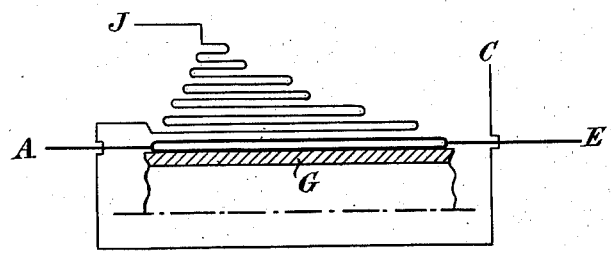

Figure 1 is a diagram of the arrangement described in the former specification modified in accordance with the present invention, and Figs. 2 to 4 show modified forms of the induction-coil.

In Fig. 1, $a$ is the aerial conductor; $b$, a local battery; $c$, a condenser; $e$, a connection to earth or other suitable capacity; $j$, a sensitive tube or imperfect contact. $k$ are choking-coils, and $r$ a relay working a signaling or other instrument. The diagrams of the coils are greatly-enlarged half-longitudinal sections, but are not strictly to scale. In place also of showing the section of each coil or layer of wire as a longitudinal row of dots or small circles, as it would actually appear, it is for simplicity shown as a single continuous longitudinal straight line. A is the end of the primary which is connected to the aerial conductor $a$, and E is the end connected to earth or a capacity. J is the end of the secondary which is directly connected to the sensitive tube or imperfect contact $j$, and C is the end which is connected to it through the condenser. G is a glass tube on which the coils are wound. The wires are preferably insulated by a single covering of silk.

The following table gives particulars of coils which have been successfully used:

| Figure in drawings. | Diameter of tube (G) in centimeters. | Diameter of wires, in centimeters. | | Resistance in ohms. | | Number of turns in windings. | | Length, in centimeters. |
|---|---|---|---|---|---|---|---|---|
| | | Primary. | Secondary. | Primary. | Secondary. | Primary. | Secondary. | |
| Fig. 1 | .935 | .01 | .01 | | | 2 layers of 100 turns each, in parallel. | 3 sections of 10, 12, 10 layers, with 150 / 45 40 45 / 40 39 40 / 35 37 35 / 30 35 30 / 25 33 25 / 20 29 20 / 15 25 15 / 12 21 17 / 5 15 14 / 10 / 5 turns. | 2.5 |
| Fig. 2 | .937 | .012 | .012 | | | do | 4 sections of 9 layers each, with 40 80 40 / 35 85 85 35 / 30 80 80 30 / 27 27 27 27 / 23 23 23 23 / 20 20 20 20 / 15 15 15 15 / 10 10 10 10 / 5 5 5 5 turns. | 4.0 |

| Figure in drawings. | Diameter of tube G, in centimeters. | Diameter of wires, in centimeters. | | Resistance, in ohms. | | Number of turns in windings. | | Length, in centimeters. |
|---|---|---|---|---|---|---|---|---|
| | | Primary. | Secondary. | Primary. | Secondary. | Primary. | Secondary | |
| Fig. 3 | .037 | .011 | .011 | 4.8 | 61 | ......do...... | 3 sections of 15 layers each, with 153 60 63 50 50 40 40 35 35 33 33 30 30 27 27 24 24 23 23 17 18 15 15 10 10 6 6 2 2 turns. | 2.5 |
| Fig. 4 | .075 | .012 | .012 | | | 2 layers of 110 each, in parallel | 12 layers of 100 80 75 60 50 45 40 28 20 15 10 5 turns. | 1.8 |

The coils are wound in the following manner:

In Fig. 1, G is a glass tube, and on it is wound the primary in two layers, there being one hundred and sixty turns in each layer. The ends of these two coils or layers are connected in parallel, one to the aerial conductor and the other to earth. On the outer coil of the primary is wound the first or inner coil of the secondary, which is continuous and has one hundred and fifty turns. The left-hand end of the wire forming this layer is then wound or coiled upon it to form the second layer of the left-hand section of the secondary, forty-five turns being given. On this comes the third layer with forty turns, and the other layers with thirty-five, thirty, twenty-five, twenty, fifteen, twelve, and five turns, respectively, follow. After winding the outer layer (that with five turns) of the left-hand section of the secondary the wire is led down and coiled on the middle of the first or inner layer of the secondary, so as to form the middle section of the secondary, forty turns being given, and then follow layers with thirty-nine, thirty-seven, thirty-five, thirty-three, twenty-nine, twenty-five, twenty-one, fifteen, ten, and five turns, respectively, the wire from the outer layer (that with five turns) being connected to the left-hand side of the condenser c and the left-hand choking-coil k. The right-hand end of the wire forming the inner layer of the secondary is wound on the right-hand end of that layer, forty-five turns being given, and then follow layers with forty, thirty-five, thirty, twenty-five, twenty, fifteen, seventeen, and fourteen turns, respectively, so forming the right-hand section of the secondary, the wire from the outer layer (that with fourteen turns) being connected directly to the left-hand end of the sensitive tube j.

In Fig. 2, G is a glass tube, and on it is wound the primary in two layers, there being one hundred and sixty turns in each layer. The ends of these two coils or layers are connected in parallel, one to the aerial conductor and the other to earth. On the outer coil of the primary is wound the first or inner coil of the secondary, which is in three sections, the middle one having eighty turns. The other layers of the secondary are in four sections, the two middle ones being formed by winding the two ends of the wire forming the middle of the inner layer upon that layer, thirty-five turns being given in each case, and upon the second layers so formed follow layers with thirty, twenty-seven, twenty-three, twenty, fifteen, ten, and five turns, respectively. After winding the outer layers of the two middle sections (those with five turns) the ends of the wire are led down and coiled on the ends of the primary, forming the inner layers of the two outer sections of the secondary, forty turns being taken in each case. On each of these inner layers follow in each case layers of thirty-five, thirty, twenty-seven, twenty-three, twenty, fifteen, ten, and five turns, respectively, the wire from the outer layer (that with five turns) of the left-hand section being connected to the left-hand side of the condenser c and the left-hand choking-coil k and the wire from the outer layer (that with five turns) of the right-hand section being connected directly to the left-hand end of the sensitive tube j.

In Fig. 3, G is a glass tube, and on it is wound the primary in two layers, there being one hundred and sixty turns in each layer. The ends of these two coils or layers are connected in parallel, one to the aerial conductor and the other to earth. On the outer coil of the primary is wound the first or inner coil of the secondary, which is continuous and has one hundred and fifty-three turns. The other layers of the secondary are in two sections, the second layers being formed by winding the ends of the wire forming the inner layer upon that layer, sixty turns being given in the left-hand section and sixty-three in the right-hand section. These layers are followed by layers of fifty, forty, thirty-five, thirty-three, thirty, twenty-seven, twenty-four, twenty-three, seventeen, fifteen, ten, six, and two turns each in the case of the left-hand section and by layers of fifty, forty, thirty-five, thirty-three, thirty, twenty-seven, twenty-four, twenty-two, eighteen, fifteen, ten, six, and two turns each in the case of the right-hand section, the wire from the outer layer (that with two turns) of the left-hand section being connected to the left-hand side of the condenser c and the left-hand choking-coil k and the wire from the outer layer (that with two turns) of the right-hand section being connected directly to the left-hand end of the sensitive tube j.

This application is a division of my application filed June 13, 1899, Serial No. 720,355, wherein are made claims covering generically the subject-matter specifically claimed herein.

The method in which the sections of the coil are connected is found to be important.

I claim—

1. In a receiver for electrical oscillations, the combination of an imperfect electrical contact, a local circuit through it, an induction-coil, the primary of which consists of two wires connected in parallel wound in two layers, the secondary of which is wound in sections each consisting of several layers, a capacity connected to one end of the primary, a conductor connected to the other end, and connections between the ends of the imperfect contact and the ends of the secondary.

2. In a receiver for electrical oscillations, the combination of an imperfect electrical contact, a local circuit through it, an induction-coil, the primary of which consists of two wires connected in parallel wound in two layers, the secondary of which is wound in sections each consisting of several layers, a capacity connected to one end of the primary, a conductor connected to the other end, connections between the ends of the imperfect contact and the ends of the secondary, and a condenser in one of the latter connections.

3. In a receiver for electrical oscillations, the combination of an imperfect electrical contact, a local circuit through it, an induction-coil, the primary of which consists of two wires connected in parallel wound in two layers, the secondary of which is wound in sections each consisting of several layers, the ends of the secondary leading from the outer layers of two of the sections, a capacity connected to one end of the primary, a conductor connected to the other end, and connections between the ends of the imperfect contact and the ends of the secondary.

4. In a receiver for electrical oscillations, the combination of an imperfect electrical contact, a local circuit through it, an induction-coil, the primary of which consists of two wires connected in parallel wound in two layers, the secondary of which is wound in sections each consisting of several layers, the ends of the secondary leading from the outer layers of two of the sections, a capacity connected to one end of the primary, a conductor connected to the other end, connections between the ends of the imperfect contact and the ends of the secondary, and a condenser in one of the latter connections.

5. In a receiver for electrical oscillations, the combination of an imperfect electrical contact, a local circuit through it, an induction-coil, the primary of which consists of two wires connected in parallel wound in two layers, the secondary of which consists of several layers, the number of turns in the outer layers being less than in those next the primary, a capacity connected to one end of the primary, a conductor connected to the other end, and connections between the ends of the imperfect contact and the ends of the secondary.

6. In a receiver for electrical oscillations, the combination of an imperfect electrical contact, a local circuit through it, an induction-coil, the primary of which consists of two wires connected in parallel wound in two layers, the secondary of which consists of several layers, the numbers of turns in the outer layers being less than in those next the primary, a capacity connected to one end of the primary, a conductor connected to the other end, connections between the ends of the imperfect contact and the ends of the secondary, and a condenser in one of the latter connections.

7. In a receiver for electrical oscillations, the combination of an imperfect electrical contact, a local circuit through it, an induction-coil, the primary of which consists of two wires connected in parallel wound in two layers, the secondary of which is wound in sections each consisting of several layers, the number of turns in the outer layers being less than in those next the primary, a capacity connected to one end of the primary, a conductor connected to the other end, and connections between the ends of the imperfect contact and the ends of the secondary.

8. In a receiver for electrical oscillations, the combination of an imperfect electrical contact, a local circuit through it, an induction-coil, the primary of which consists of two wires connected in parallel wound in two layers, the secondary of which is wound in sections each consisting of several layers, the number of turns in the outer layers being less than in those next the primary, a capacity connected to one end of the primary, a conductor connected to the other end, connections between the ends of the imperfect contact and the ends of the secondary, and a condenser in one of the latter connections.

9. In a receiver for electrical oscillations, the combination of an imperfect electrical contact, a local circuit through it, an induction-coil, the primary of which consists of two wires connected in parallel wound in two layers, the secondary of which is wound in sections each consisting of several layers, a capacity connected to one end of the primary, a conductor connected to the other end, and connections between the ends of the imperfect contact and the ends of the secondary.

10. In a receiver for electrical oscillations, the combination of an imperfect electrical contact, a local circuit through it, an induction-coil, the primary of which consists of two wires connected in parallel wound in two layers, the secondary of which is wound in sections each consisting of several layers, a capacity connected to one end of the primary, a conductor connected to the other end, connections between the ends of the imperfect contact and the ends of the secondary, and a condenser in one of the latter connections.

11. In a receiver for electrical oscillations, the combination of an imperfect electrical contact, a local circuit through it, an induction-coil, the primary of which consists of two wires connected in parallel wound in two layers, the secondary of which is wound in sections each consisting of several layers, the ends of the secondary leading from the outer layers of two of the sections, a capacity connected to one end of the primary, a conductor connected to the other end, and connections between the ends of the imperfect contact and the ends of the secondary.

12. In a receiver for electrical oscillations, the combination of an imperfect electrical contact, a local circuit through it, an induction-coil, the primary of which consists of two wires connected in parallel wound in two layers, the secondary of which is wound in sections each consisting of several layers, the ends of the secondary leading from the outer layers of two of the sections, a capacity connected to one end of the primary, a conductor connected to the other end, connections between the ends of the imperfect contact and the ends of the secondary, and a condenser in one of the latter connections.

13. In a receiver for electrical oscillations, the combination of an imperfect electrical contact, a local circuit through it, an induction-coil, the primary of which consists of two wires connected in parallel wound in two layers, the secondary of which is wound in sections each consisting of several layers, the number of turns in the outer layers being less than in those next the primary, the ends of the secondary leading from the outer layers of two of the sections, a capacity connected to one end of the primary, a conductor connected to the other end, and connections between the ends of the imperfect contact and the ends of the secondary.

14. In a receiver for electrical oscillations, the combination of an imperfect electrical contact, a local circuit through it, an induction-coil, the primary of which consists of two wires connected in parallel wound in two layers, the secondary of which is wound in sections each consisting of several layers, the number of turns in the outer layers being less than in those next the primary, the ends of the secondary leading from the outer layers of two of the sections, a capacity connected to one end of the primary, a conductor connected to the other end, connections between the ends of the imperfect contact and the ends of the secondary, and a condenser in one of the latter connections.

15. In a receiver for electrical oscillations, the combination of an imperfect electrical contact, a local circuit through it, an induction-coil, the primary of which consists of two wires connected in parallel wound in two layers, the secondary of which consists of several layers, the number of turns in the outer layers being less than in those next the primary and wound unsymmetrically with a lump at one end, a capacity connected to one end of the primary, a conductor connected to the other end, and connections between the ends of the imperfect contact and the ends of the secondary.

16. In a receiver for electrical oscillations, the combination of an imperfect electrical contact, a local circuit through it, an induction-coil, the primary of which consists of two wires connected in parallel wound in two layers, the secondary of which consists of several layers, the number of turns in the outer layers being less than in those next the primary and wound unsymmetrically with a lump at one end, a capacity connected to one end of the primary, a conductor connected to the other end, connections between the ends of the imperfect contact and the ends of the secondary, and a condenser in one of the latter connections.

17. In a receiver for electrical oscillations, the combination of an imperfect electrical contact, a local circuit through it, an induction-coil, the primary of which consists of wires connected in parallel, the secondary of which is wound in sections each consisting of several layers, a capacity connected to one end of the primary, a conductor connected to the other end, and connections between the ends of the imperfect contact and the ends of the secondary.

GUGLIELMO MARCONI.

Witnesses:
J. ERSKINE-MURRAY,
R. B. RANSFORD.